US008027806B2

(12) United States Patent
Swanson

(10) Patent No.: US 8,027,806 B2
(45) Date of Patent: Sep. 27, 2011

(54) METHOD AND SYSTEM FOR COMPUTER-ASSISTED TEST CONSTRUCTION PERFORMING SPECIFICATION MATCHING DURING TEST ITEM SELECTION

(75) Inventor: Len Swanson, Hopewell, NJ (US)

(73) Assignee: Educational Testing Service, Princeton, NJ (US)

( * ) Notice: Subject to any disclaimer, the term of this patent is extended or adjusted under 35 U.S.C. 154(b) by 158 days.

(21) Appl. No.: 12/453,651

(22) Filed: May 18, 2009

(65) Prior Publication Data

US 2009/0233262 A1    Sep. 17, 2009

Related U.S. Application Data

(63) Continuation of application No. 11/623,369, filed on Jan. 16, 2007, now Pat. No. 7,536,273, which is a continuation of application No. 11/299,363, filed on Dec. 9, 2005, now Pat. No. 7,165,012, which is a continuation of application No. 10/731,776, filed on Dec. 9, 2003, now abandoned.

(51) Int. Cl.
*G09B 3/00* (2006.01)
(52) U.S. Cl. ........ 702/182; 434/322; 434/323; 434/118; 434/362; 434/350; 706/47
(58) Field of Classification Search .................. 702/182; 434/322, 323, 324, 325, 337, 350, 351, 352, 434/353, 362, 365, 118; 706/45, 52, 915, 706/927, 47, 11
See application file for complete search history.

(56) References Cited

U.S. PATENT DOCUMENTS

| | | | | |
|---|---|---|---|---|
| 5,261,823 A | * | 11/1993 | Kurokawa | 434/323 |
| 5,565,316 A | | 10/1996 | Kershaw et al. | |
| 5,810,605 A | * | 9/1998 | Siefert | 434/362 |
| 5,827,070 A | | 10/1998 | Kershaw et al. | |
| 5,829,983 A | * | 11/1998 | Koyama et al. | 434/118 |

(Continued)

FOREIGN PATENT DOCUMENTS

JP    7234630 A    9/1995

(Continued)

OTHER PUBLICATIONS

Anderson, et al.; Educational Measurement; George Banta Publishing Company, American Council on Education; Entire Book; 1951.

(Continued)

*Primary Examiner* — Carol Tsai
(74) *Attorney, Agent, or Firm* — Jones Day

(57) ABSTRACT

A method and system for constructing a test using a computer system that performs specification matching during the test creation process is disclosed. A test developer determines one or more test item databases from which to select test items. The test item databases are organized based on psychometric and/or content specifications. The developer can examine the textual passages, artwork or statistical information pertaining to a test item before selecting it by clicking on a designation of the test item in a database. The developer can then add the test item to a list of test items for the test. The test development system updates pre-designated psychometric and content specification information as the developer adds each test item to the test. The test developer can use the specification information to determine whether to add to, subtract from, or modify the list of test items selected for the test.

18 Claims, 2 Drawing Sheets

U.S. PATENT DOCUMENTS

| | | | |
|---|---|---|---|
| 5,987,443 A * | 11/1999 | Nichols et al. | 706/11 |
| 6,000,945 A * | 12/1999 | Sanchez-Lazer et al. | 434/322 |
| 6,018,617 A | 1/2000 | Sweitzer et al. | |
| 6,259,890 B1 | 7/2001 | Driscoll et al. | |
| 6,381,604 B1 | 4/2002 | Caughran et al. | |
| 6,442,370 B1 * | 8/2002 | Driscoll et al. | 434/350 |
| 6,648,651 B1 * | 11/2003 | Cadman et al. | 434/322 |
| 6,704,741 B1 * | 3/2004 | Lively et al. | 1/1 |
| 6,705,870 B2 | 3/2004 | Penno et al. | |
| 6,847,962 B1 | 1/2005 | Cochran et al. | |
| 2002/0160348 A1 | 10/2002 | Lin et al. | |
| 2002/0182579 A1 | 12/2002 | Driscoll et al. | |
| 2003/0138765 A1 | 7/2003 | Bowers | |
| 2003/0157469 A1 | 8/2003 | Embretson | |
| 2003/0182289 A1 | 9/2003 | Anderson et al. | |
| 2004/0115597 A1 | 6/2004 | Butt | |
| 2004/0219504 A1 | 11/2004 | Hattie | |
| 2005/0125196 A1 | 6/2005 | Swanson | |
| 2005/0153269 A1 | 7/2005 | Driscoll et al. | |
| 2005/0250087 A1 | 11/2005 | Driscoll et al. | |

FOREIGN PATENT DOCUMENTS

| | | |
|---|---|---|
| WO | WO 94/09466 A | 4/1994 |
| WO | WO 99/40555 A | 8/1999 |
| WO | WO 02/09391 A | 1/2002 |

OTHER PUBLICATIONS

Angoff, et al.; Educational Measurement, 2nd Edition; American Council on Education; Entire Book; 1971.

Hambleton, Robert K.; Principles and Selected Applications of Item Response Theory; in Educational Measurement, Robert Linn (Ed.); University of Massachusetts at Amherst; Ch. 4; pp. 147-200; 1989.

Millman, Jason, Greene, Jennifer; The Specification and Development of Tests of Achievement and Ability; in Educational Measurement, Robert Linn (Ed.); Cornell University; Ch. 8; pp. 335-365; 1993.

Baker, Frank B.; Computer Technology in Test Construction and Processing; in Educational Measurement, Robert Linn (Ed.); University of Wisconsin; Ch. 10; pp. 409-427; 1989.

* cited by examiner

METHOD AND SYSTEM FOR COMPUTER-ASSISTED TEST CONSTRUCTION PERFORMING SPECIFICATION MATCHING DURING TEST ITEM SELECTION

CROSS-REFERENCE TO RELATED APPLICATIONS

This patent application is a continuation of copending U.S. patent application Ser. No. 11/623,369 filed Jan. 16, 2007, entitled "Method and System for Computer-Assisted Test Construction Performing Specification Matching During Test Item Selection," which is a continuation of U.S. patent application Ser. No. 11/299,363 filed Dec. 9, 2005, now U.S. Pat. No. 7,165,012, entitled "Method and System for Computer-Assisted Test Construction Performing Specification Matching During Test Item Selection," which is a continuation of U.S. patent application Ser. No. 10/731,776 filed Dec. 9, 2003, abandoned, entitled "Method and System for Computer-Assisted Test Construction Performing Specification Matching During Test Item Selection." The entire contents of each of the above-identified patent applications are incorporated herein by reference.

FIELD OF THE INVENTION

The present invention generally related to the field of test construction. The present invention particularly relates to a method and system for constructing a test using a computer system. Specifically, the present invention relates to a method and system for constructing a test using a computer system that performs specification matching during the test creation process.

BACKGROUND OF THE INVENTION

Testing services administer a variety of standardized tests. For example, the Graduate Management Admission Test® (GMAT®) evaluates graduate business school applicants by measuring general verbal, mathematical, and analytical writing skills. The Graduate Record Examinations® (GRE®) assists graduate schools and departments in graduate admissions activities. Tests offered include the General Test, which measures developed verbal, quantitative, and analytical abilities, and the Subject Tests, which measure achievement in 14 different fields of study. The Scholastic Assessment Test® (SAT®) Program includes the SAT I: Reasoning Test and SAT II: Subject Tests. The SAT I is a three-hour test, primarily multiple-choice, that measures verbal and mathematical reasoning abilities. The SAT II: Subject Tests are one-hour, mostly multiple-choice, tests in specific subjects. These tests measure knowledge of particular subjects and the ability to apply that knowledge. Colleges and universities typically use the SAT®. Program as a factor in determining admission or placement of prospective students. Individual states also administer tests to determine whether and to what extent students meet state standards for educational achievement.

Many tests, such as the above-mentioned tests, are offered multiple times during a year and/or are administered over multiple years. It is important, in the case of tests that are offered multiple times during a year, that the different administrations of each test be approximately equal in difficulty in order to properly rate examinees from different testing dates against one another. For tests that are administered over multiple years, it is important that each test be of a known difficulty level to accurately assess an examinee's performance and progress. Moreover, it may be important to evaluate other psychometric specifications and statistical properties for a given test prior to its administration.

Some current methods for constructing test, including those using a computer interface, permit a test developer to view and select test items. Other methods can display a match between content specifications and the content properties of the selected test items. For example, such test construction systems typically keep track of metrics such as the number of questions that test a particular subject. On the SAT I, for example, questions are divided into mathematics and verbal questions. Additionally, the test construction system could also keep track of the number of questions that are devoted to a sub-topic (such as geometry or algebra) or that are presented in a certain format (such as an analogy completion, sentence completion or word problem). By identifying the number of questions of a particular type included in the developed test, the test developer may be alerted if an incorrect number of questions of an incorrect number of questions of a particular type are included in the test.

However, systems implementing these methods do not combine all of the features listed above to permit the test developer to develop tests more quickly, while at the same time including the ability to determine if the selected test items meet psychometric specifications for a test and also permitting a test developer to examine content or psychometric specifications during the test development process so that the test developer can add, remove or replace test items to adjust for deficiencies with respect to test specifications during the test item selection process.

Thus, a need exists for an evaluation tool that determines whether defined content and psychometric specifications for a test are met by a particular question set.

A further need exists for providing psychometric and statistical information to a test creator during the test creation process to permit evaluation and adjustment of the selected test items during the test creation process.

SUMMARY OF THE PREFERRED EMBODIMENTS

Before the present methods, systems and materials are described, it is to be understood that this invention in not limited to the particular methodologies, systems and materials described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a," "an," and "the" include plural references unless the context clearly dictates otherwise. Thus, for example, reference to a "test item" is a reference to one or more test items and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described. All publications mentioned herein are incorporated by reference. Nothing herein is to be construed as an admission that the invention is not entitled to antedate such disclosure by virtue of prior invention.

The present invention includes a database of test items and information regarding test items and test. The information may include the content structure and statistical properties of test items and the content and psychometric specifications for tests to be constructed from the database. Psychometric specifications include specifications related to the measurement of human characteristics. Psychometric specifications may be used to develop tests in areas such as intelligence testing, personality testing and vocational testing.

The present invention may further include a systematic procedure for selecting items for a test using a computer system connected to the database described above. As the test is being constructed, the extent to which the developing test matches the content and psychometric specifications for the test may be displayed so that a developer may adjust the set of items selected to best match those specifications.

In a preferred embodiment, a method of constructing a test includes selecting a test item for inclusion in a set of selected test items, updating at least one evaluation statistic based on the selected test item, and revising the set of selected test items to substantially correlated the at least one evaluation statistic with at least one specification for a test. The test item may be selected at least in part based on a subject matter for the test item. The at least one evaluation statistic may be selected from content specifications and psychometric The at least one specification may also be selected from content specifications and psychometric specifications. The content specifications may include a number of test items to be presented in each of one or more pre-determined formats, a total number of test items to be included in the set of selected test items, a number of test items for testing each of one or more pre-determined subject matters, a key distribution, a percentage of test items having one more pre-defined characteristics, a gender or racial orientation of test items, and a language in which the test items are presented. The psychometric specifications may include an overall test difficulty rating, a correlation between a correct response for a selected test item and a particular cognitive or behavioral trait, an orientation of the presentation of questions and answers for the set of selected test items, a number of pages of text for a test, a mean point-biserial, a mean r-biserial, and an arrangement of the set of selected test items.

In a preferred embodiment, a method for constructing a test includes selecting a portion of a test item database from which to select a set of test items for a test having one or more test specifications, displaying information concerning a plurality of test items in the selected portion of the test item database, examining a test item on a display device, selecting the test item for the test, and updating a value for at least one test specification based on specified properties for the selected test item. Selecting a portion of a test item database may be based on the subject matter of the test items contained within the portion of the test item database. Examining a test item may include viewing an image of the test item, statistical properties of the test item, text passages associated with the test item, and answer key, detailed content specifications, reviewers' comments, scoring guidelines, and artwork associated with the test item. The statistical properties may include one or more of a percentage of correct responses for the test item, t-biserials, r-biserials, item response theory parameter, gender-based response statistics, race-based response statistics, a percentage of responses choosing each distracter, and a frequency of previous usage for the test item. Updating a value for at least one test specification may be performed using item response theory. In an embodiment, the method further includes comparing current values for the one or more test specifications with required values for the one or more test specifications. In an embodiment, the method further includes replacing one or more test items in the set of selected test items based on the one or more updated specifications. In an embodiment, the method further includes adding one or more test items to the set of selected test items based on the one or more updated specification. In an embodiment, the method further includes removing one of more test items from the set of selected test items based on the one or more updated specifications.

In a preferred embodiment, a system for constructing a test includes a processor, a computer-readable medium operably connected to the processor, and a display. The computer-readable medium contains one or more databases each having a plurality of test items. Each test item includes a textual question and one or more answers for the test item, a content structure of the test item, and one or more statistical properties for the test item. The statistical properties may include a percentage of correct responses for the test item, t-biserials, r-biserials, item response theory parameters, gender-based response statistics, race-based response statistics, a percentage of responses choosing each distracter, and a frequency of previous usage for the test item. The computer-readable medium may further include content specifications for a test, and psychometric specifications for the test. In an embodiment, the processor evaluated the content specifications and psychometric specifications for a test while the test is being created and determines a correlation value between the properties of the plurality of test items for the test and the content specifications and psychometric specifications for the test. The display displays the correlation value to the test developer. In an embodiment, the computer-readable medium further contains instructions for performing a method of constructing a test including selecting a test item for inclusion in a set of selected test items, updating at least one evaluation statistic based on the selected test item, and revising the set of selected test items to substantially correlate the at least one evaluation statistic with at least on specification for a test.

BRIEF DESCRIPTION OF THE DRAWINGS

The accompanying drawings, which are incorporated in and form a part of the specification, illustrate preferred embodiments of the present invention, and together with the description serve to explain the principles of the invention. The embodiment illustrated in the drawings should not be read to constitute limiting requirements, but instead are intended to assist the reader in understanding the invention.

DETAILED DESCRIPTION OF PREFERRED EMBODIMENTS

The present invention relates to a method and system for constructing a test using a computer system. Specifically, the present invention relates to a method and system for constructing a test using a computer system that performs specification matching during the test creation process.

Figure 1:
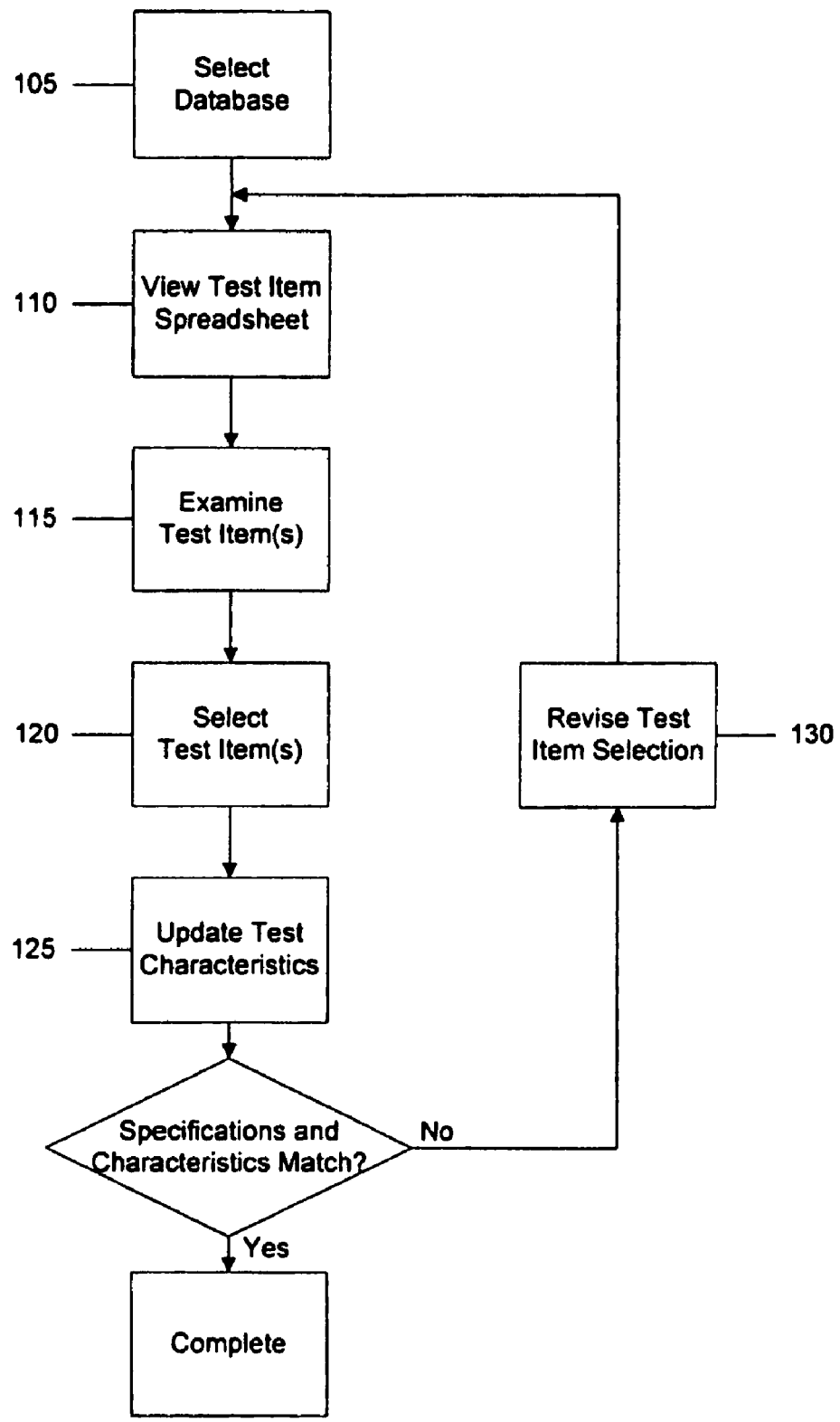
FIG. 1 depicts an exemplary process flow for creating a test according to an embodiment of the present invention.

FIG. 1 depicts an exemplary process flow for creating a test according to an embodiment of the present invention. First, the test developer may determine 105 the portion of the test item database or a particular test item database from which to select a test item for the test. The test item database may be a single repository containing all selectable test items for one or more tests. Alternatively, a test developer may choose questions from a plurality of test item database. The test items contained within a portion of the test item database or within a particular test item database may possess distinguishing characteristics. For example, a particular test item database may contain test items pertaining only to questions for testing knowledge of geometric principles. The characteristics used to distinguish test items within a portion of the test item database or a particular test item database from other test items or test item databases may correspond to psychometric specifications or content specifications for a test. When the test item database or databases are organized in this manner, the test developer may more quickly modify the set of selected test items to match specifications that are not satisfied during test construction.

The test developer may then view 110 a spreadsheet displaying information about the test items within the portion of the test item database or the particular test item database. A computer system may be used to display the spreadsheet. The test developer may examine 115 an individual test item on a display device of the computer system prior to adding the test item to the test under development. Examining 115 an individual test item may include viewing the test item image, information about the test item and information about related entities such as text passages or artwork associated with the test item. Test item information may include, for example, an answer key, detailed content specifications, reviewers' comments, scoring guidelines (for constructed-response test items), statistical properties for the test item, such as a percentage of correct answers received if the test item was previously administered, t-biserials, r-biserials, item response theory parameters, gender-based response statistics, race-based response statistics, a percentage of responses choosing each distracter, and the frequency with which the question or a similar variant has been included on previous test administrations.

Upon reviewing the information, the test developer may select 120 individual test items for inclusion in the test. As the developer selects test items, the resulting correlation between content and psychometric specifications for the test and the corresponding characteristics of the user-selected test may be updated 125. If the selected test items do not meet one or more specifications, the developer may revise 130 his or her test item selection until a best matching between the test item properties and the content and psychometric specifications is achieved. In an exemplary embodiment, item response theory may be used in the matching of test item properties to test specifications. In an alternate embodiment, the percentage of examinees that answer a test item correctly may be used in the matching of test item properties to test specifications. These methods of determining test item properties are merely exemplary and are not meant to be limiting. Additional methods for determining test item properties may be performed singly or in combination with the above-listed methods and are intended to be encompassed within the scope of the present invention without limitation.

Figure 2:
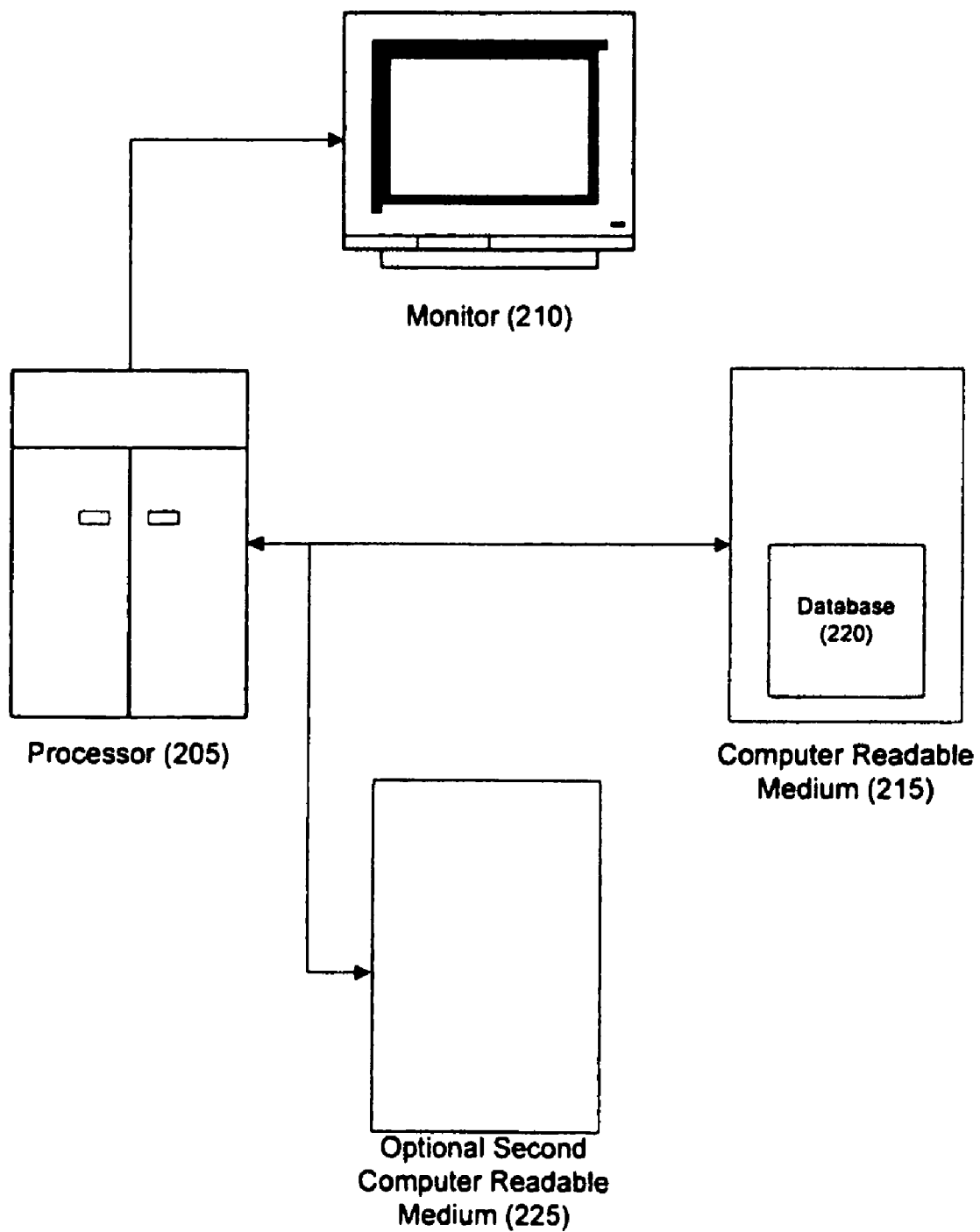
FIG. 2 depicts an exemplary system for creating a test according to an embodiment of the present invention.

FIG. 2 depicts an exemplary system for creating a test according to an embodiment of the present invention. The system may include a computer system 200 containing a processor 205, a display 210 and a computer-readable medium 215, such as a hard drive, a floppy disk, a CD, a DVD, RAM, ROM, EPROM, EEPROM or other memory or memory storage device. The computer-readable medium 215 may contain a database 220 including potential test items and information about test items and tests.

The information about the test items may include content structure and statistical properties of the test items, The content structure may denote the format of the question, the information being tested, the style of question, and similar content-related information. The statistical properties may include the percentage of examinees that select a particular response, the correlation between selecting a particular response and exhibiting a particular personality trait (in the case of behavioral or psychological testing), and the like.

The information regarding the tests may include content specifications and psychometric specifications for tests to be constructed from the database 220. The content specifications may list requirements for the test such as requiring a certain percentage of test items to be in multiple-choice format, to test verbal skills, or to be of a specified length. Content specifications may also include, without limitation, specifying the overall test length, the number of test items presented on a particular topic, a key distribution, the percentage of test items with particular characteristics, a gender or racial orientation of items and the language in which the test is presented. Psychometric specifications may include, without limitation, a preferred overall test difficulty, a correlation between a correct response for a test item and a particular cognitive or behavioral trait, the orientation of the presentation of questions and answers for test items, mean point-biserials, mean r-biserials and the visual presentation of the testing materials.

The above-listed specifications are merely representative of specifications and properties that may be included in the database 220. It will be evident to one of skill in the art that more or fewer properties and specifications may be included in the database and still be within the scope of the invention.

The computer-readable medium 215 or a second computer-readable medium 225 operably connected to the processor 205 may contain a computer program for implementing a systematic procedure for selecting items for a test. The program may display the extent to which a test under development matches the content and psychometric specifications as a user constructs the test. In this way, the user may replace, remove, or add one or more test items to the set of selected test items to best match those specifications in an efficient manner.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A computer-implemented method of constructing a test, comprising:
   receiving at a computer a selection for a test item for inclusion in a set of test items;
   updating with the computer a correlation value based on the set of test items including the selected test item, wherein the correlation value indicates an extent of correlation between the set of test items and a test specification, the test specification comprising one or more of an overall test difficulty rating, a correlation between a correct response for a selected test item and a particular cognitive or behavioral trait, an orientation of the presentation of questions and answers for the set of selected test items, a number of pages of text for a test, a mean point-biserial, a mean r-biserial, and an arrangement of the set of selected test items;
   determining with the computer whether the set of test items including the selected item satisfies the test specification;

if the set of test items including the selected test item does not satisfy the test specification, receiving input at the computer revising the set of test items in order to satisfy the test specification.

2. The method of claim 1, wherein the test specification comprises one or more of:
   a number of tests items to be presented in each of one or more pre-determined formats;
   a total number of test items to be included in the set of selected test items;
   a number of test items for testing each of one or more pre-determined subject matters;
   a key distribution;
   a percentage of test items having one or more pre-defined characteristics;
   a gender or racial orientation of test items; and
   a language in which the test items are presented.

3. The method of claim 1, comprising displaying information for a plurality of test items on a display, the plurality of test items being selectable with the computer by a user for inclusion in the set of test items.

4. The method of claim 3, the information for a test item comprising one or more of:
   an image of the test item;
   statistical properties of the test item;
   text passages associated with the test item;
   an answer key;
   detailed content specifications;
   reviewers' comments;
   scoring guidelines; and
   artwork associated with the test item.

5. The method of claim 1, comprising displaying the correlation value.

6. The method of claim 1, the test item comprising a question and one or more answers.

7. A computer system for constructing a test, comprising:
   a processor;
   a memory; and
   a display,
   the processor configured to execute steps comprising:
      receiving at a computer a selection for a test item for inclusion in a set of test items;
      updating with the computer a correlation value based on the set of test items including the selected test item, wherein the correlation value indicates an extent of correlation between the set of test items and a test specification, the test specification comprising one or more of an overall test difficulty rating, a correlation between a correct response for a selected test item and a particular cognitive or behavioral trait, an orientation of the presentation of questions and answers for the set of selected test items, a number of pages of text for a test, a mean point-biserial, a mean r-biserial, and an arrangement of the set of selected test items;
      determining with the computer whether the set of test items including the selected item satisfies the test specification;
      if the set of test items including the selected test item does not satisfy the test specification, receiving input at the computer revising the set of test items in order to satisfy the test specification.

8. The computer system of claim 7, wherein the test specification comprises one or more of:
   a number of tests items to be presented in each of one or more pre-determined formats;
   a total number of test items to be included in the set of selected test items;
   a number of test items for testing each of one or more pre-determined subject matters;
   a key distribution;
   a percentage of test items having one or more pre-defined characteristics;
   a gender or racial orientation of test items; and
   a language in which the test items are presented.

9. The computer system of claim 7, comprising displaying information for a plurality of test items on a display, the plurality of test items being selectable with the computer by a user for inclusion in the set of test items.

10. The computer system of claim 9, the information for a test item comprising one or more of:
   an image of the test item;
   statistical properties of the test item;
   text passages associated with the test item;
   an answer key;
   detailed content specifications;
   reviewers' comments;
   scoring guidelines; and
   artwork associated with the test item.

11. The computer system of claim 7, comprising displaying the correlation value.

12. The computer system of claim 7, the test item comprising a question and one or more answers.

13. An article of manufacture for constructing a test, the article comprising a computer-readable storage medium having instructions embodied therein for causing for a computer to execute steps including:
   receiving at the computer a selection for a test item for inclusion in a set of test items;
   updating with the computer a correlation value based on the set of test items including the selected test item, wherein the correlation value indicates an extent of correlation between the set of test items and a test specification, the test specification comprising one or more of an overall test difficulty rating, a correlation between a correct response for a selected test item and a particular cognitive or behavioral trait, an orientation of the presentation of questions and answers for the set of selected test items, a number of pages of text for a test, a mean point-biserial, a mean r-biserial, and an arrangement of the set of selected test items;
   determining with the computer whether the set of test items including the selected item satisfies the test specification;
   if the set of test items including the selected test item does not satisfy the test specification, receiving input at the computer revising the set of test items in order to satisfy the test specification.

14. The article of manufacture of claim 13, wherein the test specification comprises one or more of:
   a number of tests items to be presented in each of one or more pre-determined formats;
   a total number of test items to be included in the set of selected test items;
   a number of test items for testing each of one or more pre-determined subject matters;
   a key distribution;
   a percentage of test items having one or more pre-defined characteristics;
   a gender or racial orientation of test items; and
   a language in which the test items are presented.

15. The article of manufacture of claim 13, comprising instructions for causing the computer to display information for a plurality of test items on a display, the plurality of test items being selectable with the computer by a user for inclusion in the set of test items.

16. The article of manufacture of claim 15, the information for a test item comprising one or more of:
an image of the test item;
statistical properties of the test item;
text passages associated with the test item;
an answer key;
detailed content specifications;
reviewers' comments;
scoring guidelines; and
artwork associated with the test item.

17. The article of manufacture of claim 13, comprising displaying the correlation value.

18. The computer system of claim 13, the test item comprising a question and one or more answers.

* * * * *